US007353026B2

(12) United States Patent
Lee

(10) Patent No.: US 7,353,026 B2
(45) Date of Patent: Apr. 1, 2008

(54) METHOD FOR PERFORMING HARD HAND-OFF IN CELLULAR MOBILE COMMUNICATION SYSTEM

(75) Inventor: Jae-Duck Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 323 days.

(21) Appl. No.: 10/010,800

(22) Filed: Dec. 7, 2001

(65) Prior Publication Data

US 2002/0107020 A1    Aug. 8, 2002

(30) Foreign Application Priority Data

Feb. 3, 2001    (KR)    ................... 2001-5242

(51) Int. Cl.
*H04Q 7/20*    (2006.01)
(52) U.S. Cl. ................... 455/436; 455/437; 455/453
(58) Field of Classification Search ........... 455/436, 455/432.1, 438, 439, 524, 525, 560, 561, 455/434, 442, 440, 437, 447, 453; 370/331, 370/332

See application file for complete search history.

(56) References Cited

U.S. PATENT DOCUMENTS

| 5,999,522 | A | * | 12/1999 | Rohani | 370/331 |
| 6,021,123 | A | * | 2/2000 | Mimura | 370/331 |
| 6,026,301 | A | * | 2/2000 | Satarasinghe | 455/436 |
| 6,075,990 | A | * | 6/2000 | Shin | 455/440 |
| 6,208,862 | B1 | * | 3/2001 | Lee | 455/442 |
| 6,321,090 | B1 | * | 11/2001 | Soliman | 455/440 |
| 6,393,003 | B1 | * | 5/2002 | Lee | 370/331 |
| 6,400,952 | B2 | * | 6/2002 | Kim et al. | 455/436 |
| 6,434,387 | B1 | * | 8/2002 | Lee | 455/436 |
| 6,438,376 | B1 | * | 8/2002 | Elliott et al. | 455/437 |
| 6,449,481 | B1 | * | 9/2002 | Kwon et al. | 455/437 |
| 6,459,689 | B1 | * | 10/2002 | Czaja et al. | 370/331 |
| 6,542,743 | B1 | * | 4/2003 | Soliman | 455/436 |

(Continued)

FOREIGN PATENT DOCUMENTS

GB    2 341 513    3/2000

(Continued)

OTHER PUBLICATIONS

Australian Office Action dated Dec. 18, 2002 issued in a counterpart application, namely Appln. No. 13551/02.

*Primary Examiner*—Jean Gelin
*Assistant Examiner*—Kiet Doan
(74) *Attorney, Agent, or Firm*—The Farrell Law Firm, PC

(57) ABSTRACT

A method for performing a hard hand-off between service areas in a cellular mobile communication system is provided. The method for performing a hard hand-off according to the invention includes the steps of setting an area of services covered with a frequency assignment (FA) unavailable to adjacent stations to be a boundary cell, entering into the set boundary cell by a mobile communication terminal during communication, and searching FAs of adjacent stations excluding the base station currently engaged in communication with said mobile communication terminal so as to determine a target FA, with which the mobile communication terminal is to perform a hard hand-off. The method for performing a hard hand-off according to the invention can prevent deterioration of call qualities caused by unnecessary hard hand-offs, and reduce the load on a system.

3 Claims, 5 Drawing Sheets

U.S. PATENT DOCUMENTS

| | | | |
|---|---|---|---|
| 6,546,248 B1 * | 4/2003 | Jou et al. | 455/434 |
| 6,549,780 B2 * | 4/2003 | Schiff et al. | 455/439 |
| 6,741,859 B2 * | 5/2004 | Otsuka et al. | 455/438 |
| 6,748,215 B1 * | 6/2004 | Chen et al. | 455/434 |
| 6,810,252 B1 * | 10/2004 | Kwon | 455/436 |
| 6,882,846 B1 * | 4/2005 | O'Byrne | 455/447 |
| 7,023,822 B1 * | 4/2006 | Czaja et al. | 370/332 |
| 2002/0032034 A1 * | 3/2002 | Tiedmann et al. | 455/437 |

FOREIGN PATENT DOCUMENTS

| | | |
|---|---|---|
| WO | WO 96/13952 | 5/1996 |

* cited by examiner

METHOD FOR PERFORMING HARD HAND-OFF IN CELLULAR MOBILE COMMUNICATION SYSTEM

PRIORITY

This application claims priority to an application entitled "Method for Performing Hard Hand-off in Cellular Mobile Communication System" filed with the Korean Industrial Property Office on Feb. 3, 2001 and assigned Serial No. 2001-5242, the contents of which are hereby incorporated by reference.

BACKGROUND OF THE INVENTION

1. Field of the Invention

The present invention relates to a cellular mobile communication system, and in particular, to a method for performing a hard hand-off between service areas of base stations.

2. Description of the Related Art

FIG. 1 is a diagram illustrating a construction of a conventional cellular mobile communication system. Referring to FIG. 1, a plurality of base transceiver subsystems (BTSs) 20, 30, 40 connect mobile communication terminal 10 within the corresponding cells 21, 31, 41 to radio channels, and perform communications. A base station controller (BSC) 50 controls the plurality of BTSs 20, 30, 40. A mobile switching center (MSC) 60 connects the BSC 50 to other subscriber systems. The mobile communication system constructed above provides a soft or hard hand-off function so that the mobile communication terminal 10 can maintain a call while moving between the cells.

In a mobile communication system operating under code division multiple access (CDMA) technology, a single frequency channel can be basically classified into a plurality of code channels. Therefore, all the base stations have at least a single common frequency assignment (a common FA). However, where there is a need to increase capacity due to an increase of users, new frequency assignments may be added to several base stations. For instance, downtown areas of cities having quite a number of subscribers require many more frequency assignments, while suburbs require less number of frequency assignments. Here, a hard hand-off occurs when the mobile communication terminal is moving from a source station to a destination station, and when the destination station is unable to provide services with the frequency assignment currently engaged in communication with the mobile terminal.

The service area covered by a particular frequency assignment unavailable to adjacent stations is defined to be a border cell. Data on the border cell is stored in the BSC 50. The mobile communication terminal entering into the border cell searches a target frequency assignment (a target FA) under any conditions so as to be ready to perform the hard hand-off. At this stage, the mobile communication terminal searches the common FA of the base station it is currently engaged in communication with as well as of all the adjacent stations. Normally, the signal of the common FA of the base station that the mobile communication terminal is currently engaged in communication with is detected to be the most intensive.

FIG. 2 is a diagram illustrating an operation of a hard hand-off according to the conventional technology. The source station and the destination station are divided into three sectors α, β, γ, respectively. The sectors in the source station can provide services with 1FA and 2FA, while the sectors in the destination station can provide services with 1FA only. If the α sector is the only sector among all the sectors in the source station adjacent to the destination station, the area of services provided with the 2FA of the α sector is set to be a border cell. Data on such border cell is pre-stored in the BSC.

Referring to FIG. 2, if the mobile communication terminal, currently engaged in communication in the β sector of the source station with the 2FA, enters the overlapping area between the α sector, which is a boundary cell, and the β sector, the mobile communication terminal connects the communication with both the 2FA in the α sector and the 2FA in the β sector due to a soft hand-off, and starts searching the target FA from all the available common FAs. This is because the α sector is a boundary cell. As the mobile communication terminal moves toward the destination station, the signal from the α sector becomes weak. Then, the target FA should be determined.

Under normal circumstances, however, the characteristic of the radio frequency signal is unstable in the boundary cell area due to interference between frequencies. Therefore, the 1FA, which is the common FA of the source station rather than that of the destination station, can be determined as the target FA. In that case, the mobile communication terminal drops both the 2FA of the α sector and the 2FA of the β sector to perform a hard hand-off to the 1FA of the α sector. In other words, the mobile communication terminal performs a hard hand-off in the overlapping area between the α sector and the β sector as well as in the boundary cell. Moreover, if the mobile communication terminal enters deeper into the destination station, the hand-off to the destination station needs to be performed once more.

In the method for performing a hard hand-off under the conventional technology as described above, even the overlapping area between the boundary cells and adjacent cells thereof are recognized as boundary cells. As a result, an unnecessary hard hand-off operation is performed because the common FAs of all the base stations, including the base station currently engaged in communication, have been searched. As is well known, the hard hand-off poses a problem of lowering the quality of communication because the call is re-connected once it is dropped.

SUMMARY OF THE INVENTION

It is, therefore, an object of the present invention to provide a method for performing a hard hand-off in a boundary cell.

It is another object of the present invention to provide a method for performing a hard hand-off that can search common FAs only of the base stations excluding the base station currently in communication when determining a target FA in a boundary cell.

According to one aspect of the present invention, there is provided a method for performing a hard hand-off in a cellular mobile communication system, comprising the steps of: setting a service area covered with an FA unavailable to adjacent stations; entering into the set boundary cell by a mobile communication terminal during communication; and searching FAs of adjacent stations excluding the base station currently engaged in communication so as to determine a target FA, with which the mobile communication terminal is to perform the hard hand-off.

According to another aspect of the present invention, there is provided a method for performing a hard hand-off in a cellular mobile communication system, comprising the steps of: setting a service area covered with an FA unavailable to adjacent stations; establishing a call in the set boundary cell by a mobile communication terminal to initiate communication; and searching FAs of adjacent stations excluding the base station currently engaged in communication so as to determine a target FA, with which the mobile communication terminal is to perform the hard hand-off.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. The terms to be described herein below are the ones defined by considering their functions in the present invention, and may be variable depending on the intention of the user or a practice. Therefore, those terms should be defined in light of an entire context of the specification.

Figure 1:
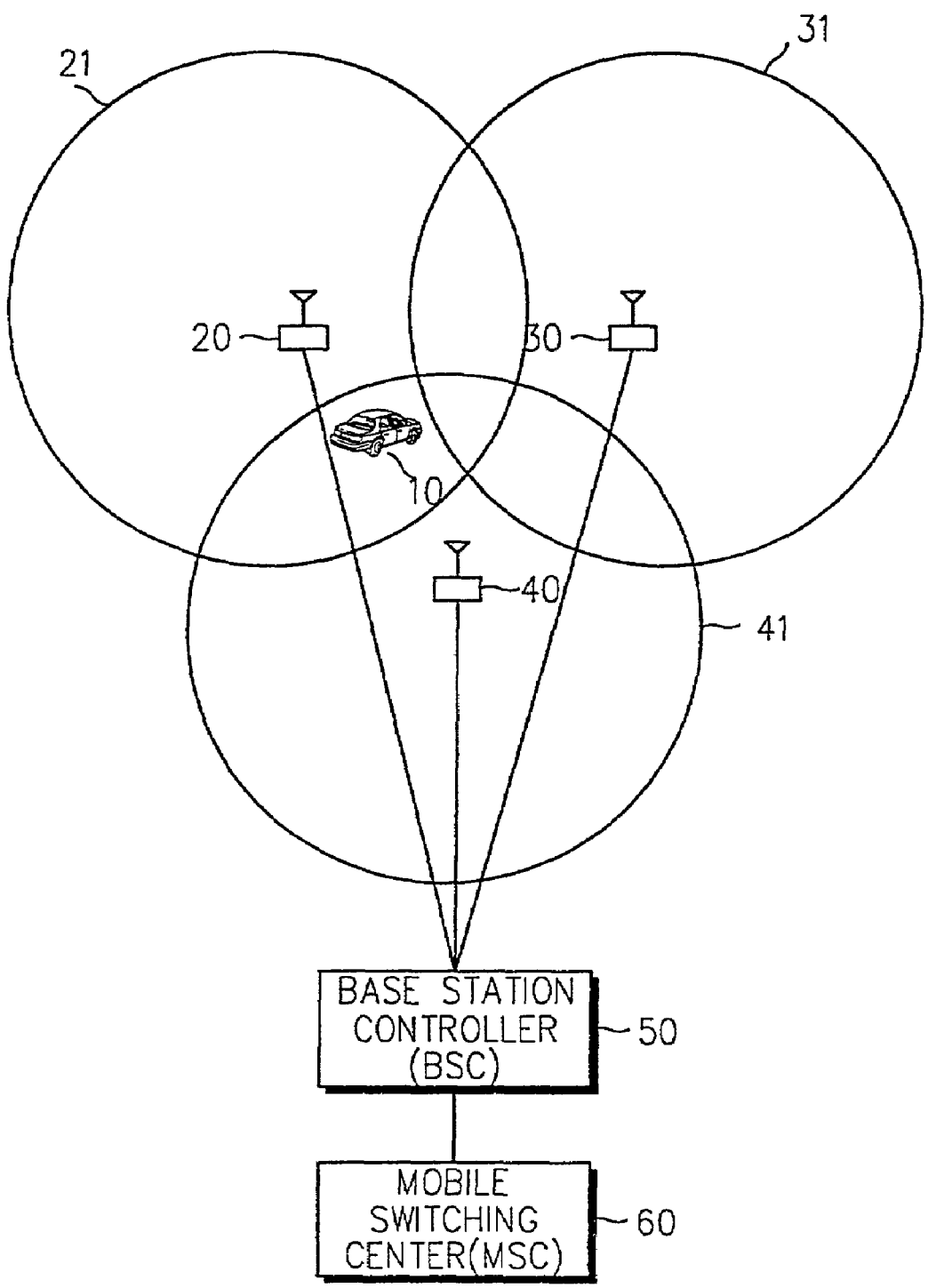
FIG. 1 is a diagram illustrating a construction of a conventional cellular mobile communication system.
Figure 2:
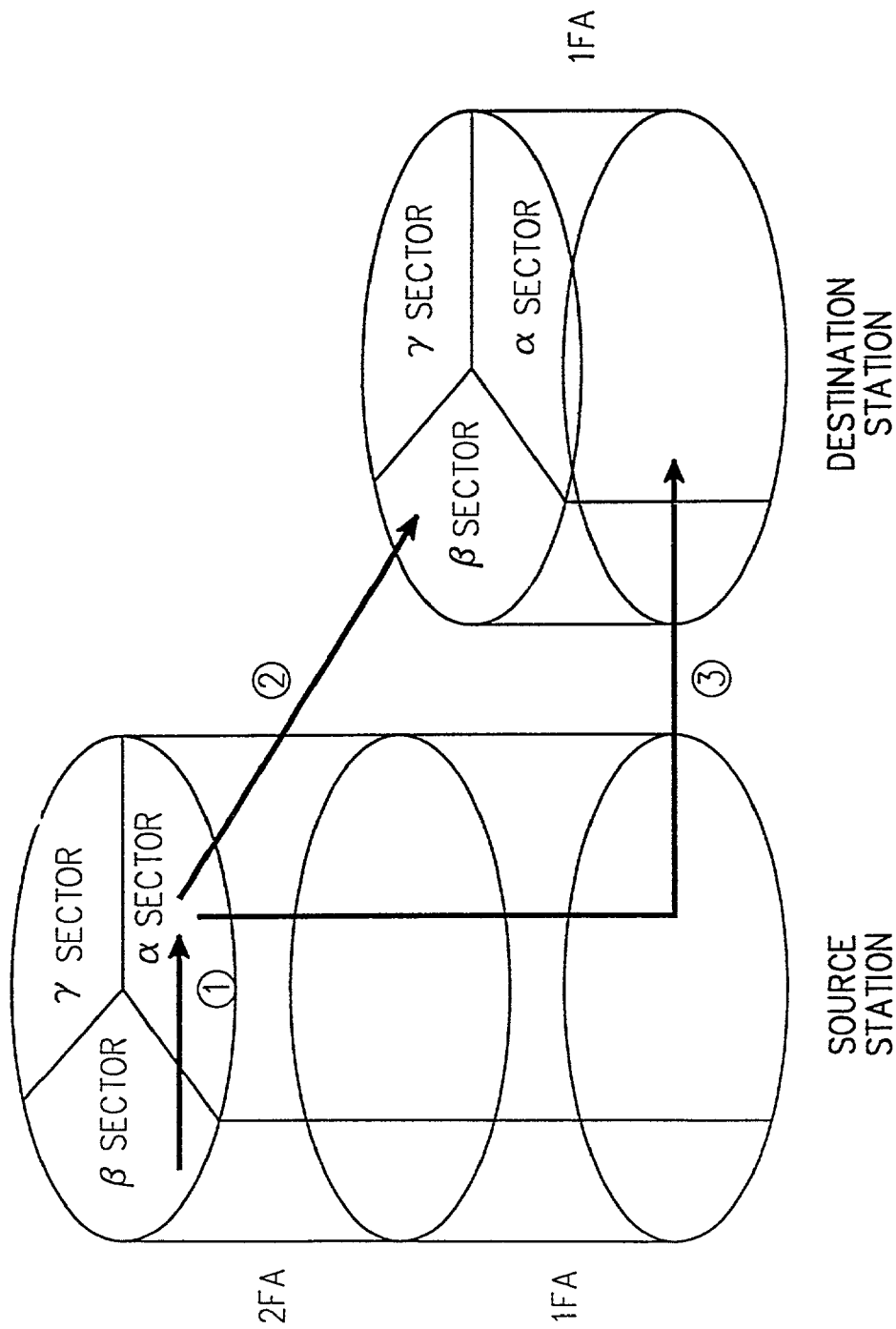
FIG. 2 is a diagram illustrating an operation of a hard hand-off according to the conventional technology.
Figure 3:
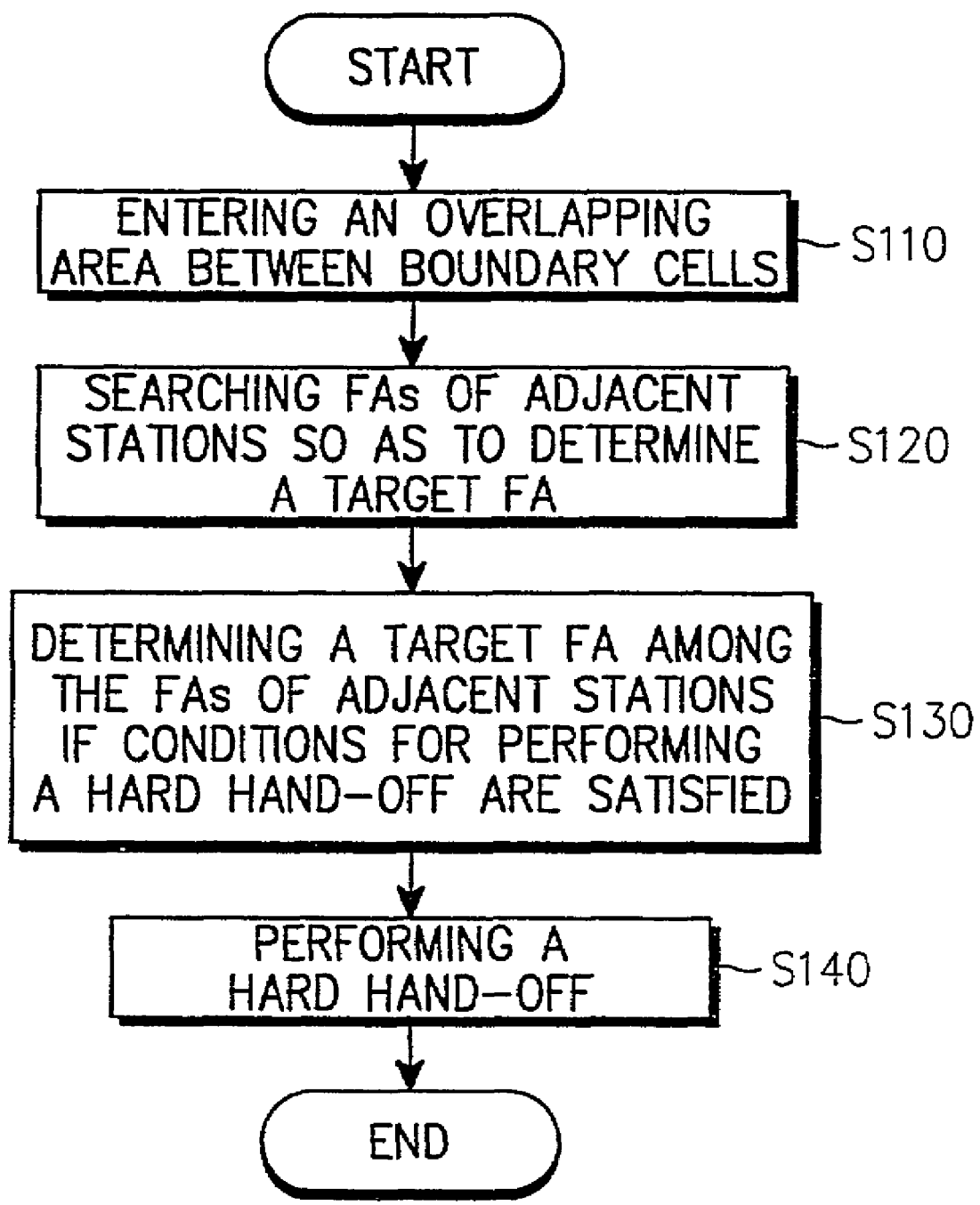
FIG. 3 is a flow chart illustrating a hard hand-off operation according to the present invention.

FIG. 3 is a flow chart illustrating a hard hand-off operation according to the present invention. Referring to FIG. 3, the mobile communication terminal initiates a call in a boundary cell in step S110. In other cases, the mobile communication terminal currently engaged in communication enters the boundary cell from an adjacent cell in step 110. Here, the boundary cell is a geographical area, in which services are provided with an FA unavailable to adjacent stations. Data set for the boundary cell is pre-stored in the BSC.

To specifically describe step 110, each base station and/or sector transmits a pilot signal containing original identifier data by using all the available FAs. The mobile communication terminal measures all the pilot signals having a detectable intensity, and reports the measured values to the BSC through the base station currently in tune. The BSC controlling the hand-off operation can determine whether or not the mobile communication terminal is engaged in communication within the boundary cell by using the reported results. If a determination of the results finds that the mobile communication terminal is currently engaged in communication within the boundary cell, the BSC transmits a candidate frequency search request message (CFSRM) to the mobile communication terminal. The CFSRM commands searching for a target FA, with which the hard hand-off is to be performed.

In step 120, the mobile communication terminal starts searching the FAs of adjacent stations in response to the CFSRM. Here, the mobile communication terminal searches the common FAs of all the adjacent stations except the base station it is currently engaged in communication with and reports the measured pilot signal intensity values to the BSC. The searching and reporting operations continue while the mobile communication terminal performs communication in the boundary cell.

If hard hand-off performing conditions are satisfied while the mobile communication terminal performs communication in the boundary cell in step S130, one of the common FAs of the adjacent stations searched in step S120 is determined to be a target FA, with which the hard hand-off is to be performed.

To specifically describe step S130, the BSC analyzes the pilot signal intensity values measured and reported by the mobile communication terminal in step S120 to check if the values satisfy the hard hand-off performing conditions. For instance, if the mobile communication terminal determines the signal intensity level of the boundary cell, in which the mobile communication terminal is engaged in communication, to be lower than the predetermined drop level T_DROP for a predetermined reference time T_TDROP, the BSC determines a target FA, with which the hard hand-off is to be performed, among the common FAs of the adjacent stations that have been searched and reported by the mobile communication terminal. Here, the target FA may be determined to be an FA having the highest degree of signal intensity among the searched and reported common FAs.

In step S140, the mobile communication terminal performs the hard hand-off with the determined target FA under the control by the BSC.

To specifically describe step S140, once the target FA is determined, the BSC transmits a message commanding a hard hand-off to the mobile communication terminal. The message commanding the hard hand-off includes data on the determined target FA. Then, the mobile communication terminal disconnects the FA currently engaged in communication from the boundary cell, and retains communication by connecting the determined target FA. Here, the determined target FA is an FA of an adjacent station. Therefore, the mobile communication terminal acts as if it has performed a hard hand-off with the FA of the adjacent station.

By taking the above steps, the mobile communication terminal can directly perform the hard hand-off from the source station to the destination station. In particular, the present invention is applicable to a softer hand-off state, in which the mobile communication terminal connects communication with two or more sectors of the source station, or to a soft hand-off state, in which the mobile communication terminal connects communication with two or more base stations.

Figure 4:
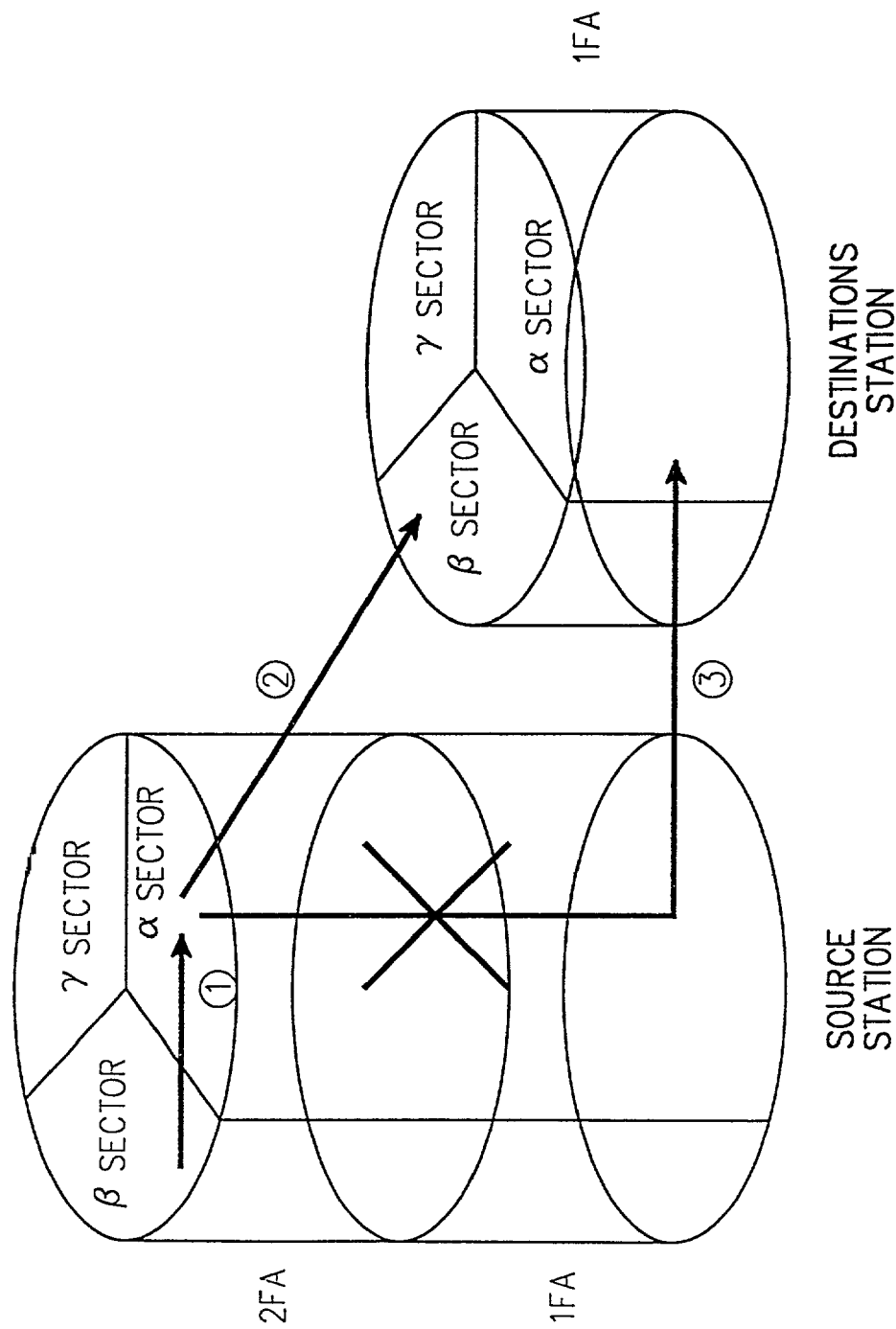
FIG. 4 is a diagram illustrating the hard hand-off operation according to the present invention.

FIG. 4 is a diagram illustrating the hard hand-off operation according to the present invention. Referring to FIG. 4, the source station and the destination station are divided into three sectors of α, β, γ, respectively. The sectors of the source station can provide services with 1FA and 2FA, while the sectors of the destination station can provide services with 1FA only. Here, the 1FA is a common FA. If the α sector is the only sector among the sectors of the source station adjacent to the destination station, particularly to the β sector of the destination station, the 2FA of the α sector is determined to be a boundary cell. This is because the destination station cannot provide services with the 2FA. The data on the common FA and the boundary cell are pre-stored in the BSC that uses such data for analyzing the pilot signal intensity measured and reported by the mobile communication terminal.

FIG. 4 shows that each sector has an exact fan shape. In fact, however, the sectors are overlapped in their boundaries. If the mobile communication terminal currently engaged in communication with the 2FA of the β sector within the source station enters the overlapping area between the β sector and the α sector (i.e., softer hand-off area), the BSC commands the mobile communication terminal to connect communication with both the α sector and the β sector by means of the softer hand-off, and transmits the CFSRM to the mobile communication terminal. This is because the 2FA of the α sector is a boundary cell. Here, the CFSRM includes data on the adjacent stations as well as on the common FA, e.g., the data commanding the 1FA, which is a common FA of the destination station in case of FIG. 4.

Figure 5:
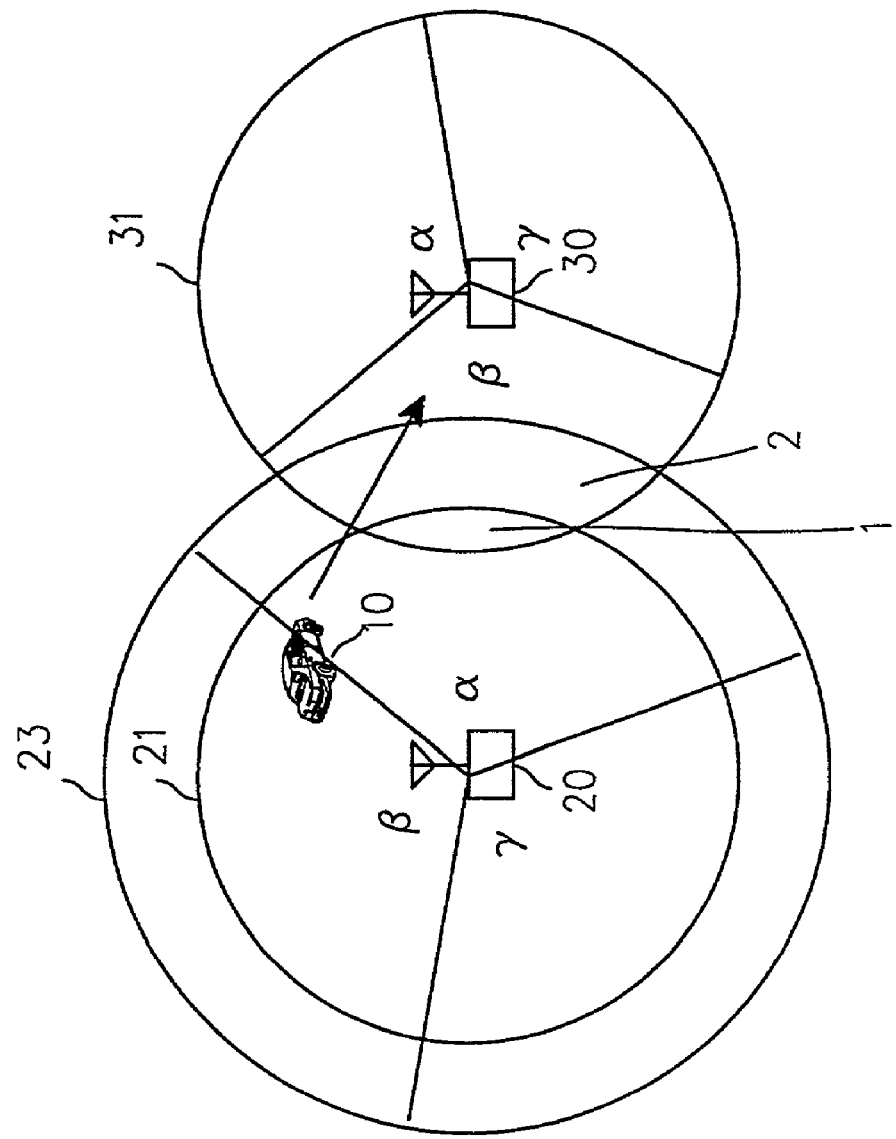
FIG. 5 is a diagram illustrating a service area of base stations having a different number of FAs.

The mobile communication terminal starts searching the 1FA of the destination station in response to the CFSRM. Here, the mobile communication terminal does not search the 1FA of the source station. Since the destination station does not provide services with the 2FA, the service area 23 of the source station 20 covered with the 2FA becomes wider than the service area 21 of the source station 20 covered by the 1FA, as shown in FIG. 5. Therefore, if a hard hand-off has occurred in the overlapping area between the source station and the destination station (area 1+area 2), the mobile communication terminal 10 needs not perform a hard hand-off with the 1FA of the source station 20. For this reason, the mobile communication terminal can search the target FA of the hard hand-off without searching the 1FA of the source station.

The mobile communication terminal regularly searches the common FA of the adjacent stations, i.e., the 1FA of the destination station, and reports the measured pilot signal intensity values to the BSC.

As the mobile communication terminal moves toward the destination station, if the signal intensity of the α sector sustains the level of being lower than a predetermined truncated reference level T_DROP for a predetermined reference time T_TDROP, the BSC determines that a hard hand-off needs to be performed, and determines the β sector of the destination station among the common FAs of the adjacent stations searched by the mobile communication terminal to be a target FA to perform the hard hand-off. If the BSC commands the mobile communication terminal to perform a hard hand-off, the mobile communication terminal performs the hard hand-off from the 2FA of the α sector of the source station to the 1FA of the β sector of the destination station under the control of the BSC.

Referring to FIG. 5, the hard hand-off is generated in the overlapping area 1 as well under the conventional technology. However, the present invention narrows the hard hand-off area by preventing the hard hand-off in the overlapping area 1.

The present invention operated as described above has its major effects as follows.

Deterioration of call qualities caused by a hard hand-off is minimized by narrowing a hard hand-off area, and the load laid on a system is reduced by not performing unnecessary hard hand-offs. Moreover, even if no call setting is allowed in a boundary cell as in the cellular mobile communication system operating under IS-95A or IS-95B, waste of source in the boundary cell is minimized by allowing the call in the boundary cell for a longer period of time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for performing a hard hand-off in a cellular mobile communication system, the method comprising the steps of:

setting an area of services covered with a frequency assignment (FA) of a plurality of FAs of a base station currently engaged in communication with a mobile communication terminal, to be a boundary cell, the FA is only included in FAs of the base station not in adjacent stations of the base station;

entering into the boundary cell by the mobile communication terminal during communication;

receiving a candidate frequency search request message, commanding the mobile communication terminal to search common FAs of only adjacent stations, except the base station currently engaged in communication, from a Base Station Controller (BSC); and searching FAs of only adjacent stations excluding the base station currently engaged in communication with said mobile communication terminal in response to the command, so as to determine a target FA, with which the mobile communication terminal is to perform the hard hand-off;

wherein the target FA is determined by the mobile communication terminal through searching common FAs of adjacent stations to perform the hard hand-off therewith;

wherein determination of the target FA includes a step of recognizing that the mobile communication terminal is currently engaged in communication in the boundary cell, and commanding the mobile communication terminal to search FAs of the adjacent stations excluding the base station currently engaged in communication with said mobile communication terminal by means of a base station controller (BSC), which controls the hand-off of the mobile communication terminal.

2. A method for performing a hard hand-off in a cellular mobile communication system, the method comprising the steps of:

setting an area of services covered with a FA of a plurality of FAs of a base station currently engaged in communication with an mobile communication terminal, to be a boundary cell, the FA is only included in FAs of the base station not in adjacent stations of the base station;

establishing a call in the boundary cell by the mobile communication terminal to initiate communication;

receiving a candidate frequency search request message commanding the mobile communication terminal to search common FAs of only adjacent stations, except the base station currently engaged in communication, from a BSC; and searching FAs of only adjacent stations excluding the base station currently engaged in communication with said mobile communication terminal in response to the command, so as to determine a target FA, with which the mobile communication terminal is to perform the hard hand-off;

wherein the target FA is determined by the mobile communication terminal through searching common FAs of adjacent stations to perform the hard hand-off therewith;

wherein determination of the target FA includes a step of recognizing that the mobile communication terminal is currently engaged in communication in a boundary cell, and commanding the mobile communication terminal to search FAs of the adjacent stations excluding the base station currently engaged in communication with said mobile communication terminal by means of a base station controller (BSC), which controls the hand-off of the mobile communication terminal.

3. A method for performing a hard hand-off in a cellular mobile communication system including at least two base stations for providing a mobile communication terminal with services by having service areas that share at least one FA and can be overlapped, and a base station controller (BSC) for controlling the hand-off of the mobile communication terminal, the method comprising the steps of:

setting an area of services covered with a FA of a plurality of FAs of a base station currently engaged in communication with a mobile communication terminal, to be a boundary cell, the FA is only included in FAs of the base station not in adjacent stations of the base station;

connecting communication with a first sector and a second sector by a softer hand-off while the mobile communication terminal moves from the first sector to the second sector of the base station currently engaged in communication with said mobile communication terminal;

recognizing the second sector to be the boundary cell, and commanding the mobile communication terminal to search common FAs of the adjacent stations, except the base station currently engaged in communication, by the BSC;

searching common FAs of only the adjacent stations by the mobile communication terminal in response to the command, and reporting the searched results to the BSC;

determining a target FA, with which the BSC is to perform a hard hand-off by using the searched results if conditions for performing the hard hand-off are satisfied; and performing the hard hand-off with the determined target FA by disconnecting the communication with the first sector and the second sector from the mobile communication terminal under a command of the BSC.

* * * * *